(12) United States Patent
Talley et al.

(10) Patent No.: US 10,803,734 B2
(45) Date of Patent: Oct. 13, 2020

(54) SYSTEMS AND METHODS FOR PERIPHERAL DEVICE POWER CONTROL

(71) Applicant: Harman Professional, Inc., Northridge, CA (US)

(72) Inventors: Jason Talley, Wiley, TX (US); Alex Stevens, Friendswood, TX (US); John Stachler, Richardson, TX (US)

(73) Assignee: HARMAN PROFESSIONAL, INC., Northridge, CA (US)

( * ) Notice: Subject to any disclaimer, the term of this patent is extended or adjusted under 35 U.S.C. 154(b) by 0 days.

(21) Appl. No.: 16/249,790

(22) Filed: Jan. 16, 2019

(65) Prior Publication Data

US 2019/0221109 A1 Jul. 18, 2019

Related U.S. Application Data

(60) Provisional application No. 62/618,611, filed on Jan. 17, 2018.

(51) Int. Cl.
| | | |
|---|---|---|
| *G08C 17/00* | (2006.01) | |
| *G06F 1/3296* | (2019.01) | |
| *G06F 1/3231* | (2019.01) | |
| *H04N 21/422* | (2011.01) | |
| *H04N 21/443* | (2011.01) | |

(52) U.S. Cl.
CPC ........... *G08C 17/00* (2013.01); *G06F 1/3231* (2013.01); *G06F 1/3296* (2013.01); *G08C 2201/12* (2013.01); *H04N 21/42206* (2013.01); *H04N 21/4436* (2013.01)

(58) Field of Classification Search
CPC .... G08C 17/00; G08C 2201/12; G06F 1/3296
USPC ........................................................ 340/12.5
See application file for complete search history.

(56) References Cited

U.S. PATENT DOCUMENTS

| | | | | |
|---|---|---|---|---|
| 9,312,390 B2 * | 4/2016 | Yamazaki | ............... | G08C 19/00 |
| 2010/0150040 A1 * | 6/2010 | Huang | .................... | G08C 17/00 |
| | | | | 370/311 |
| 2012/0194324 A1 * | 8/2012 | Rigazio | .................. | G08C 17/00 |
| | | | | 340/12.5 |
| 2015/0310720 A1 * | 10/2015 | Gettings | ............... | G08B 29/188 |
| | | | | 340/540 |
| 2016/0370834 A1 * | 12/2016 | Gelonese | ............. | H01R 25/003 |
| 2017/0094522 A1 * | 3/2017 | Wang | ..................... | H04W 12/06 |
| 2017/0322712 A1 * | 11/2017 | Peng | ...................... | G08C 17/00 |
| 2017/0344094 A1 * | 11/2017 | Ady | ....................... | G06F 1/3231 |

* cited by examiner

*Primary Examiner* — Qutbuddin Ghulamali
(74) *Attorney, Agent, or Firm* — McCoy Russell LLP

(57) ABSTRACT

The present disclosure relates to power management of a remote control device by a host control device. In one embodiment, a method for power management includes detecting, by a host control device, a status indication of the remote control device, wherein the status indication is associated with a power-on state of the remote control device. The method also includes monitoring received sensor data associated with user presence, and outputting a control signal to the remote control device for the remote control device to enter a low power state. Power management may be provided for loudspeaker units, communications devices, and display devices.

20 Claims, 4 Drawing Sheets

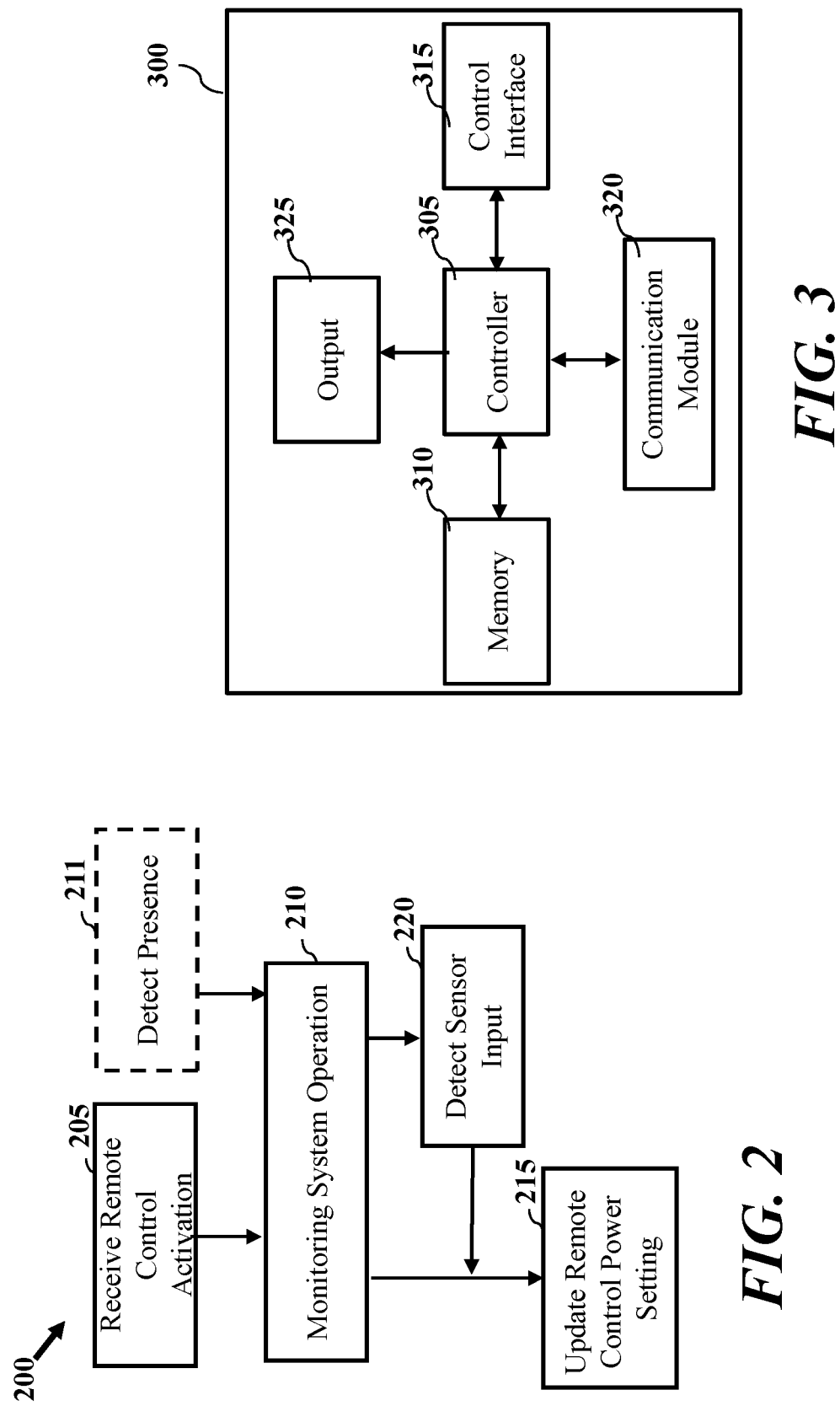

SYSTEMS AND METHODS FOR PERIPHERAL DEVICE POWER CONTROL

CROSS-REFERENCE TO RELATED APPLICATION

This application claims priority to U.S. Provisional Application No. 62/618,611 filed on Jan. 17, 2018 and titled SYSTEMS AND METHODS FOR PERIPHERAL DEVICE POWER CONTROL, the content of which is expressly incorporated by reference in its entirety.

FIELD

The present disclosure relates to electronic device power management, and more particularly to peripheral device power management.

BACKGROUND

Many devices often include a battery powered remote control or peripheral control device. These peripheral devices can allow for control and interoperation with other devices. Battery management of peripheral devices may be managed using different types of power management. Some peripheral devices, such as a wireless computer keyboard, computer mouse, etc., have low power states. Other devices, such as infrared (IR) transmitting TV remote controls typically only provide a low-power transmission function. In a similar fashion, both computer peripherals (e.g., keyboards, pointing devices) and TV remotes only provide one-way control. TV remotes also require line of sight operation. As such, these devices only use power when a button is pushed, or for a time period required for the device to transmit a control command. In these conventional devices, power states of the peripheral device are not managed by another device. Other devices are small enough that a rechargeable battery can be charged by a power outlet when needed and thus management is not as important.

There exists a need for power management of peripheral devices that are battery powered which provide more than just push button transmission by line of sight. There additionally exists a need for peripheral devices that include power management for two-way communication.

SUMMARY

Disclosed and claimed herein are methods, systems and devices for power management. One embodiment is directed to a method for power management of a remote control device by a host control device, the method including detecting, by a host control device, a status indication of the remote control device, wherein the status indication is associated with a power-on state of the remote control device. The method also including monitoring, by the host control device, received sensor data associated with user presence, and outputting, by the host control device, a control signal to the remote control device for the remote control device to enter a low power state.

In one embodiment, the host control device is at least one of a loudspeaker unit, communications device, and display device.

In one embodiment, the status indication is a wireless communication received from the remote control device.

In one embodiment, the remote control device is configured to transmit control signals to the host control device and receive control signals for an operational state of the host control device.

In one embodiment, the remote control device is configured to indicate at least one operational state of the host control device.

In one embodiment, monitoring received sensor data includes monitoring presence of at least one user relative to the host control device.

In one embodiment, monitoring received sensor data includes monitoring output signals of at least one sensor to the host control device.

In one embodiment, monitoring received sensor data associated with user presence includes detecting a vacancy for an area associated with the host control device.

In one embodiment, monitoring includes determining timeout of an idle period for the remote control device.

Another embodiment is directed to a host control device including a communications unit and a controller coupled to the communications unit. The controller is configured to detect a status indication of a remote control device, wherein the status indication is associated with a power-on state of the remote control device, and monitor received sensor data associated with user presence. The controller is also configured to output a control signal to the remote control device for the remote control device to enter a low power state.

Another embodiment is directed to a system including a remote control device and a host control device. The host control device is configured to detect a status indication of the remote control device, wherein the status indication is associated with a power-on state of the remote control, and monitor received sensor data associated with user presence. The host control device is also configured to output a control signal to the remote control device, wherein the control signal is for the remote control device to enter a low power state.

In one embodiment, the host control device is at least one of a loudspeaker unit, communications device, and display device.

In one embodiment, the status indication is a wireless communication received from the remote control device.

In one embodiment, the remote control device is configured to transmit control signals to the host control device and receive control signals for an operational state of the host control device.

In one embodiment, the remote control device is configured to indicate at least one operational state of the host control device.

In one embodiment, monitoring received sensor data includes monitoring presence of at least one user relative to the host control device.

In one embodiment, monitoring received sensor data includes monitoring output signals of at least one sensor to the host control device.

In one embodiment, monitoring received sensor data associated with user presence includes detecting a vacancy for an area associated with the host control device.

In one embodiment, monitoring includes determining timeout of an idle period for the remote control device.

In one embodiment, the remote control device is configured to enter a low power state in response to the control signal.

Another embodiment is directed to a remote control device including a communications unit and a controller coupled to the communications unit, the controller is configured to provide a status indication of the remote control device, wherein the status indication is associated with a power-on state of the remote control device. The controller is also configured to receive a control signal from a host control device, wherein the control signal is for the remote control device to enter a low power state.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2 depicts a process for device operation according to one or more embodiments;

FIG. 3 depicts a graphical representation of a host control device according to one or more embodiments;

DETAILED DESCRIPTION OF THE EXEMPLARY EMBODIMENTS

Overview and Terminology

Figure 1:
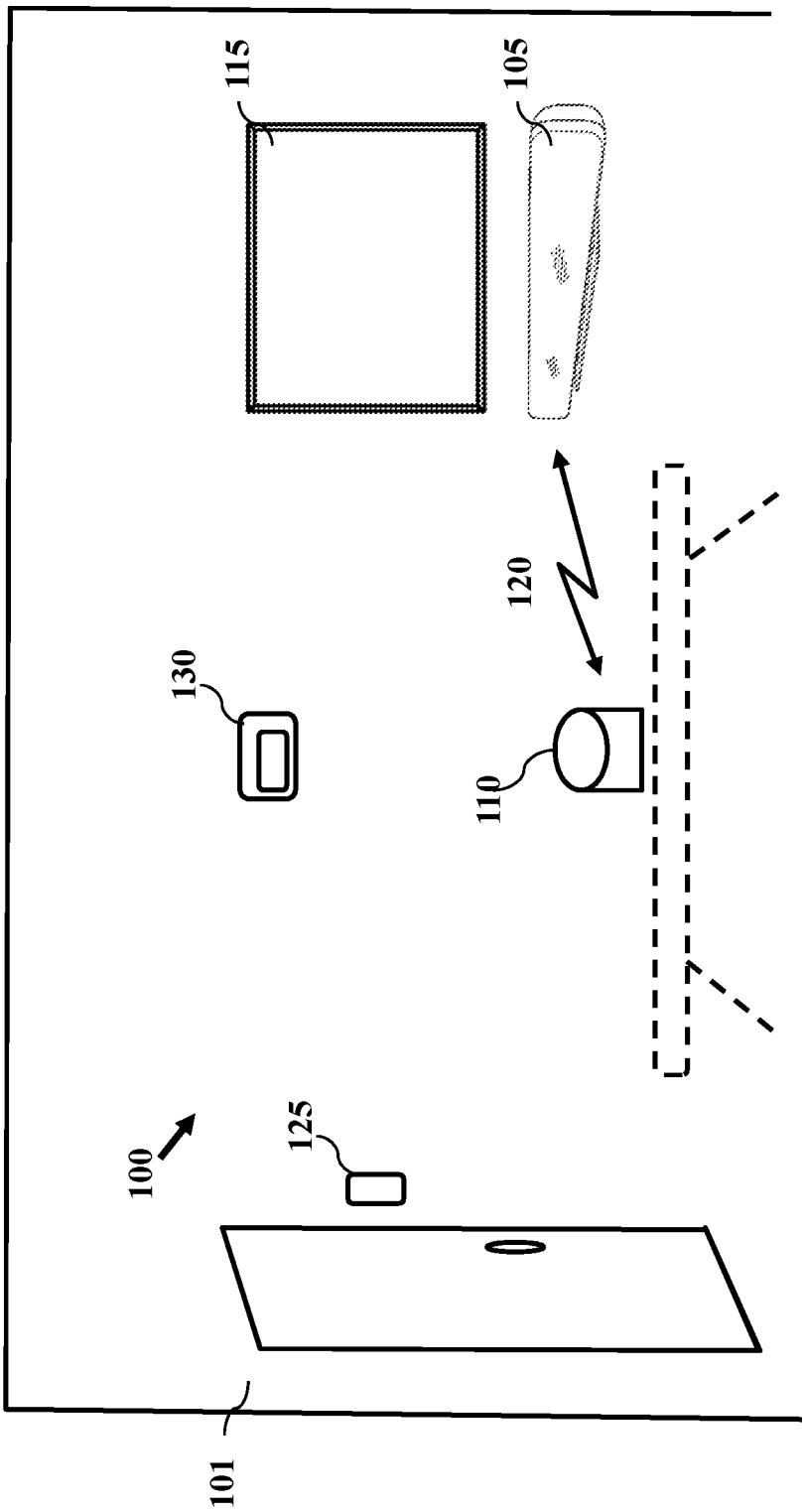
FIG. 1 depicts graphical representation of a system according to one or more embodiments.

One aspect of the disclosure is directed to peripheral device power control. In one embodiment, a process is provided that allows for power management of a peripheral device by a host device. Another embodiment is directed to functions performed by at least one of a host control device and peripheral device for power management of the peripheral device. Systems and device configurations are also provided that allow for power management of devices.

In one embodiment, a host control device is provided with functionality to control the power management state of a peripheral device. In one embodiment, the host control device may be a loudspeaker such as a sound bar and the peripheral device may be a remote control configured to provide one or more status features and control inputs for the loudspeaker. These devices may employ one or more processes or operations described herein to allow for a responsive control device from the battery powered remote control.

Embodiments are also directed to operation and control of devices for use of a soundbar for meetings and conferencing. By way of example, the sound bar may include one or more host control functions to allow for interoperation with a peripheral device such as a remote control. According to another embodiment, a power state of a remote control can be managed based on occupancy detection in a room. Once a remote control device is connected to a host control device, the remote control will stay in a powered and connected state until the room is determined vacant. As such, the remote control will not enter a sleep or low power state during a teleconference or meeting that employs the host control device.

In one embodiment, remote control devices may relate to battery powered devices configured to provide control signals to a host control device. In certain embodiments, remote control devices are configured for two-way communication with a host control device and thus, the remote control may receive status information from the host control device. Remote control devices may be configured to optimize battery life and user experience and responsiveness. As such, the remote control device may be configured with a dynamic power saving configuration that allows for a central controller or host control device to make informed decisions. A host control device may control operation based on the host controller environment and connected sensors to control how, when and for how long a remote control device, or device in general, may enter a low power state (e.g., sleep state).

Although device configurations are discussed herein with respect to meetings and conferencing, it should be appreciated that power management described herein may be applied to other devices and for additional applications.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 depicts graphical representation of a system according to one or more embodiments. According to one embodiment, power management is provided for devices including control of remote peripheral devices. System 100 includes host control device 105 and remote control device 110. In one embodiment, host control device 105 is a loudspeaker unit and remote control device 110 is a peripheral control unit that may wirelessly transmit to, and receive operational parameters from, host control device 105.

According to one embodiment, processes and device configurations are provided for host control device 105 to control the power state of remote control device 110. In addition, processes and device configurations are provided for remote control device 110 to control its own power state. According to one embodiment, a host control device 110 is configured to detect a status indication of the remote control device 105, monitor received sensor data associated with user presence (or vacancy), and output a control signal to the remote control device 105 to enter a low power state. Entering a low power state may allow for efficient management of the power source (e.g., battery) of remote control device 110 while still allowing for two-way communication and other operations.

According to one embodiment, remote control device 110 is a battery powered device that operates without connection to an external power source. As such, power management of a device, such as remote control device 110, may be imperative to prevent delay in use and to allow for functions that require a persistent communication with host control device 105. As used herein, power management may relate to multiple power states for remote control device 110. In certain embodiments, remote control device 110 may be configured with an operating power level and a low or reduced power level. In some embodiments, the low or reduced power level may relate to a sleep state where one or more functions of remote control device 110 are disabled. In other embodiments, remote control device 110 may be configured with one or more intermediary low power states. Intermediary low power states of remote control device 110 may be associated with one or more management settings. Remote control device 110 may be a device configured with network communication abilities, such as an IoT (Internet of things) device.

In one embodiment, host control device 105 relates to an electronic device that may be configured to output at least one of audio, video and multimedia content. In one embodiment, host control device 105 relates to a loudspeaker, such as a soundbar. In other embodiments, host control device 105 may relate to a display device, such as display device 115. System 100 includes display device 115 which may interoperate with host control device 105. Alternatively, functions of host control device 105 may be embodied in a display device, such as display 115. In certain embodiments, display device 115 may be configured to receive commands and/or management powered states of a peripheral device, such as remote control device 110.

According to one aspect of the disclosure, remote control device 110 may relate to a two-way device configured to transmit controls and commands to host control device 105, and configured to receive controls and commands from host control device 105. Accordingly, power management of remote control device 110 is configured to allow for battery powered operation during a session or powered-on period. Two-way communications are shown as 120 between host control device 105 and remote control device 110. According to one embodiment, two-way communication 120 can include commands from host control device 105 to change a power management setting of remote control device 110. Similarly, two-way communication 120 can include commands from remote control device 110 to change operating settings of host control device 105.

According to one embodiment, remote control device 110 relates to a two-way remote that can indicate the state of the host control device 105 (such as speaker and/or microphone mute status by way of a communication stream between host control device 105 and remote control device 110. The communication scheme may be provided by a constant (e.g. persistent) connection while the remote control device 110 is in a powered state. The communication between the remote control device 110 and host control device 105 allows for information to be timely and accurate. In situations where the host control device 105 is controlled via multiple interfaces, such as a wall switch, touch panel or other control, the communication connection may be important. As such, the higher power drawer of a persistent or connection communication link may require a dynamic power management. In one embodiment, battery longevity may be maximized by allowing host control device 105 to manage and/or direct a sleep state of remote control device 110 to one or more low power states or intermediary low power states.

According to another embodiment, operations associated with host control device 105 and remote control device 110 may relate to devices associated with audio output for teleconferencing and communication meetings. As such, in one embodiment host control device 105 may be configured to output audio for a conferencing event or meeting. As such, remote control device 110 may include one or more controls and inputs for controlling operations of the host control device. In an exemplary embodiment, remote control device 110 may include a mute button that can control a microphone or host control device and/or one or more audio input sources to host control device 105. In other embodiment, remote control device 110 may include one or more inputs for volume control, call termination, etc. Inputs of remote control device 110 may be associated with one or more functions of host control device 105. In certain embodiments, inputs of remote control device 110 may have multiple functions. By way of an example, an input of remote control device 110 may be assigned a call answer function and a call end function associated with communications output and/or processed by host control device 105.

According to one embodiment, remote control device 110 is configured to wake up from a sleep or low powered state in response to a user input (e.g., button press on the remote control) and then remain awake and in sync with the host control device 105 for at least a predetermined period d of time. If the host control device 105 determines that a meeting has ended prior to the awake time, the host control device 105 can send a communication (e.g., message, command, etc.) to the remote control 110 to enter into a reduce or low power state such as a sleep state. If the meeting runs longer than expected, the host control device 105 can keep the remote awake longer to maintain the user experience. As a result, users (e.g., meeting participants) always have up-to-date and accurate information about the state of the host control device 105, instant control of settings and an overall seamless experience with remote control device 110.

According to another embodiment, operations and configurations of host control device 105 and remote control device 110 maybe based on environmental factors detected by system 100. System 100 may include one or more sensors to detect an environmental state. According to one embodiment, one or more external sensors may provide output to host control device 105. According to another embodiment, system 100 includes sensor 125 configured to detect light control settings (e.g., light switch). According to one embodiment, when sensor 125 detects switching of light controls to an off position, host control device 105 may control remote control device 110 to a low power state. According to another embodiment, system 100 includes sensor 130 configured to detect presence (e.g., occupancy). According to one embodiment, when sensor 130 detects vacancy due to lack of activity, etc., host control device 105 may control remote control device 110 to enter into a low power state. Sensor 125 and sensor 130 may be configured to output indications to host control device 105 by way of a wired and/or wireless connection. According to one embodiment, host control device 105 may support one or more wireless communication protocols including network communication and short-range wireless connectivity.

According to one embodiment, system 100 may be employed in a meeting room, such as room 101. Room 101 may relate to a meeting space, such that external sensors associated with host control device 105 operate relative to occupancy of room 101. FIG. 1 shows remote control device 110. According to one embodiment, host control device 105 may be configured to manage power of a plurality of remote control devices.

FIG. 2 depicts a process for device operation according to one or more embodiments. According to one embodiment, process 200 may be employed by a host control device (e.g., host control device 105 of FIG. 1) to provide power management of one or more peripheral devices (e.g., remote control device 110). The host control device may be a loudspeaker unit configured to provide operation associated with a conferencing feature and/or audio output.

Process 200 may be initiated by the host control device receiving remote control activation at block 205. According to one embodiment, the remote control device may be activated by user selection of at least one input of the remote control device. In certain embodiments, the remote control device may power on in response to user input and transmit a communication to the host control device to allow for syncing each device. The host control device may be coupled to a continuous power source (e.g., electrical outlet) and thus, in a powered state to receive communications from the remote control device. In one embodiment, receiving remote control activation at block 205 is a status indication of the remote control device that may be detected by the host control device. This status indicator is associated with a power-on state of the remote control device. The status indicator may be a wireless communication received from the remote control device. Once powered on and connected, the remote control device can transmit control signals to a host control device based on user input. In addition, the remote control device can receive an operational state of the host control device. The remote control device is configured to indicate at least one operational state of the host control device, such as line muting, communication connected, etc. Receiving remote control activation at block 205 may be based on one or more sensors of the remote control. Accordingly, motion, sound, light may be detected for activation. In certain embodiments, sensor output may be compared to a baseline level to generate an activation signal by the remote control. In other embodiments, the one or more sensor outputs of the remote control may be compared to predetermined criteria or sensor output threshold to generate an activation signal.

At block 210, the host control device monitors system operation. Block 210 may include the host control device monitoring received sensor data associated with user presence and one or more other parameters. In certain embodiments, system operation may be monitored based on presence (or lack of user presence) detected at optional block 211. The presence of users may be determined at block 211 to assist with monitoring participants of a meeting. In certain embodiments, external sensors include motion sensors for a meeting space.

At block 210, the host control device can monitor received sensor data for monitoring presence of at least one user relative to the host control device. Review of the received sensor data can include monitoring output signals of at least one sensor to the host control device. Monitoring at block 210 may include detecting vacancy. Monitoring at block 210 may include determining timeout of an idle period.

System operation may include output from one or more sensing devices, such as external sensors configured to detect occupancy, vacancy, light switch operation, etc. The host control device may determine whether communications received from different devices indicate a change in presence such as vacancy. In other embodiments, a host control device may detect user operation of a remote control device. Operations and sensor output may be compared to one or more timers. By way of an example, an idle timer may be used to determine if presence indicators have not been received for a predetermined period of time. When the idle timer expires, the host control device may determine whether to reduce power of the remote control device at block 215.

Process 200 may also include detecting sensor input at block 220. Sensor input detected at block 220 may relate to input from one or more sensing devices, such as external sensors. When a vacancy is detected or other condition by the host control device indicating termination of a meeting or vacancy of the location associated with the host control device (e.g., room 101), the host control device may update remote control power at block 215. By way of example, the host control device may output a control signal at block 220 to the remote control device to enter a low power state. In certain embodiments, detecting sensor input at block 220 includes detecting output from multiple sensors including at least one of a light switch sensor, door sensor, motion activation sensor and vacancy sensor in general. As such, the control signal may update the remote control devices power usage. Block 220 may include transmitting a command to the remote control device to enter into a low powered or sleep state.

FIG. 3 depicts a graphical representation of a host control device according to one or more embodiments. According to one embodiment, a host control device may relate to electronic devices that may be operated by a remote control. In certain embodiments, host control device relates to a loudspeaker unit, such as a sound bar. In other embodiments, the host control device may relate to other types of devices. Device 300 is a representation of a host control device according to one or more embodiments.

According to one embodiment, device 300 includes controller 305, memory 310 and control interface 315. Controller 305 may relate to a processor or control device configured to direct operation of the device. Memory 310 provides non-transitory storage for operational code of device 300 which is executable by controller 305. Control interface 315 may include one or more control elements of device 300 including but not limited to on/off terminal(s), volume control, communications inputs (send/end), and control features in general.

According to one embodiment device 300 includes a communication module 320 which may be configured to receive and transmit control signals to relative to at least one device, such as a remote control unit. In certain embodiments, communications module may be configured to receive control signals from one or more external sensors.

Output 325 of device 300 relates to an output module. In a loudspeaker or soundbar configuration, output module relates to one or more speakers of device 300. Output 300 may relate to a media output, communications output, audio output, etc.

As shown in FIG. 3, controller 305 is coupled to communications module 320. Controller 305 may be configured to detect a status indication of a remote control device, such as a power-on state of the remote control device based on one or more signals received by communications module 320. Controller 305 may also monitor received sensor data associated with user presence by way of communications module 320. Controller 305 may also output control signals to the remote control device by way of communications module 320, such as a control signal to enter a low power state.

Figure 4:
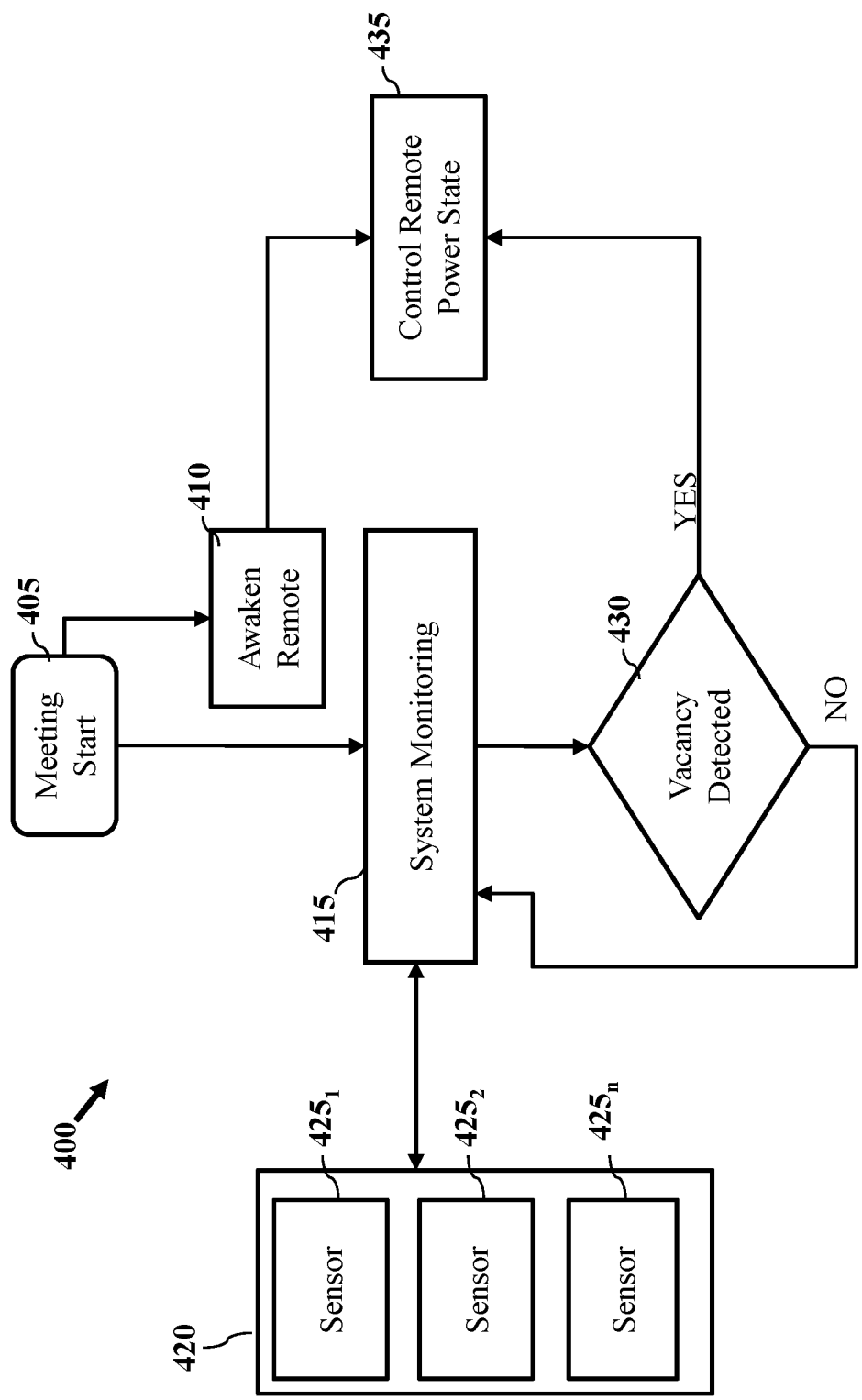
FIG. 4 depicts a graphical representation of operations according to one or more embodiments.

FIG. 4 depicts a graphical representation of operations according to one or more embodiments. According to one embodiment, process 400 may be performed by one or more devices. Process 400 may be executed by a system (e.g., system 100) including a host control device (e.g., a host control device 105) and a remote control device (e.g., remote control device 110) according to one or more embodiments. Process 400 may be employed for power management of devices, such as a remote control device associated with a meeting or conferencing ability.

Process 400 may be initiated by a meeting start at block 405. In certain embodiments, the meeting start at block 405 may relate to user operation of a remote control device such as a button press, etc., by a participant. Detection of the meeting start at block 405 may be independent of incoming communications received by a host device, or external sensor output according to certain embodiments. In other embodiments, meeting start at block 405 can include at least one of activating a host control device and beginning a communication session. In response to the meeting start at block 405, the remote control device is awakened, or powered on at block 410. In an awaken state, the remote control device is configured for two-way communication with a host control device.

According to one embodiment, the remote control device monitors idle time with respect to user input to the remote control and communications received from the host control device. The idle timer may set a time period for determining lack of activity warranting a low power state. When the idle period expires without receiving a communication from the host control device or user input, the remote control device may control its power state at block 435 to a reduced or low power state, such as a sleep state. In that fashion battery power of the remote control device may be managed to a reduce load for peripheral device battery.

Process 400 also includes system monitoring at block 415. System monitoring may be based on external sensors 420 which may include a plurality of sensor types $425_{1-n}$. The external sensors may be positioned in a meeting space to allow for vacancy detection. The host control may perform system monitoring a block 415 for identifying expiration of one or more idle timers, meeting conference progress and participant occupancy. As a result of system monitoring, the host control device may determine if a vacancy is detected at decision block 430. Vacancy detection at decision block 430 may relate to a meeting termination where remote control power is not needed. When vacancy is not detected (e.g., "NO" path of decision block 430), the host control device continues to monitor the system at block 415. When vacancy is detected (e.g., "YES" path of decision block 430), the host control device controls the remote power state at block 435.

Figure 5:
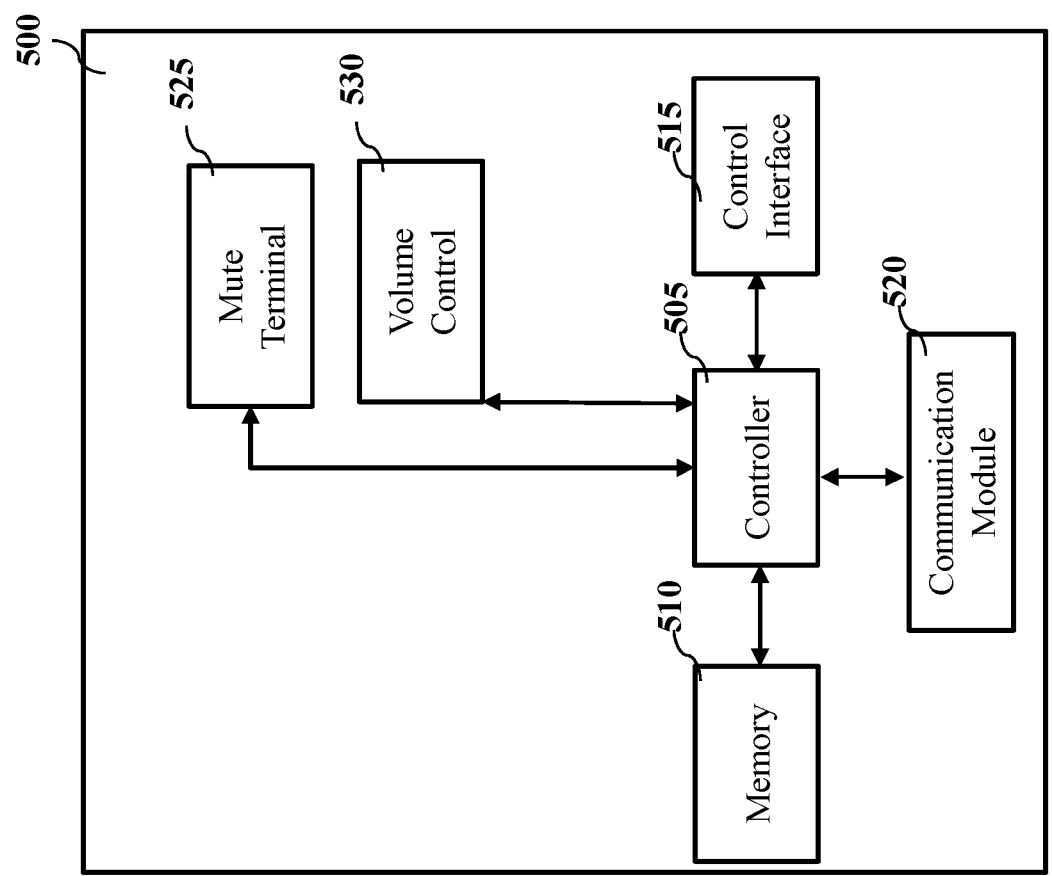
FIG. 5 depicts a graphical representation of a remote control device according to one or more embodiments.

FIG. 5 depicts a graphical representation of a remote control device according to one or more embodiments.

According to one embodiment, a remote control device may relate to electronic devices that may be operated with a host control device. Device 500 is an exemplary representation of a remote control device according to one or more embodiments.

According to one embodiment, device 500 includes controller 505, memory 510 and control interface 515. Controller 505 may relate to a processor or control device configured to direct operation of the device. Memory 510 provides non-transitory storage for operational code of device 510 which is executable by controller 505. Control interface 515 may include one or more control elements of device 500 including but not limited to on/off terminal(s), volume control, communications inputs (send/end), and control features in general. In certain embodiments, control interface 515 may include one or more sensors for detecting operation and/or presence of a user. By way of example, control interface 515 may include one or more of motion, sound and light sensors which may output to controller 505 the presence of a user or vacancy of a an area associated with device 500. Sensor output of control interface 515 may be configured to prevent entering a low power state for device 500. In other embodiments, a host control device signal to enter into a low power state may be received by communication module 520 of device 500 and used by controller 505 to override sensor output indicating user presence. In other embodiments, controller 505 may response to a host control device control signal based on sensor output of control interface 515 to indicate presence or non-vacancy.

According to one embodiment, device 500 includes a communication module 520 which may be configured to receive and transmit control signals to relative to at least one device, such as a host control device. In certain embodiments, communications module 520 may be configured to receive control signals from a host control device.

Device 500 may include one or more input terminals that upon selection cause device 500 to transmit a command to a host control device. Device 500 is shown include muter terminal 525 and volume control terminal 530. Mute terminal 525 may be selected to mute audio output of a host control device. Selection of the mute terminal 525 may result in a lighted indicated in response to another devices operation, such as illumination when in a muted state. Volume control input 530 may relate to a volume control element or elements to adjust the volume of audio output by a host control device.

As shown in FIG. 5, controller 505 is coupled to communications module 520. Controller 505 may be configured to detect a status indication of a host control device based on one or more signals received by communications module 520. Controller 505 may also monitor idle time periods associated with a lack of user input.

While this disclosure has been particularly shown and described with references to exemplary embodiments thereof, it will be understood by those skilled in the art that various changes in form and details may be made therein without departing from the scope of the claimed embodiments.

What is claimed is:

1. A method for power management of a remote control device by a host control device, the method comprising:
    detecting, by a host control device, a status indication of the remote control device, wherein the status indication is associated with a power-on state of the remote control device, the remote control device remotely located from the host control device;
    monitoring, by the host control device, received sensor data associated with user presence, wherein user presence is determined by at least one external motion sensor for a space; and
    outputting, by the host control device, a control signal to the remote control device for the remote control device to enter a low power state.

2. The method of claim 1, wherein the host control device is at least one of a loudspeaker unit, communications device, and display device, and wherein the external motion sensor is remotely located from each of the host device and the remote control device.

3. The method of claim 1, wherein the status indication is a wireless communication received from the remote control device.

4. The method of claim 1, wherein the remote control device is configured to transmit control signals to the host control device and receive control signals for an operational state of the host control device.

5. The method of claim 1, wherein the remote control device is configured to indicate at least one operational state of the host control device.

6. The method of claim 1, wherein monitoring received sensor data includes monitoring presence of at least one user relative to the host control device, wherein the method occurs during a teleconference or meeting that employs the host control device.

7. The method of claim 1, wherein monitoring received sensor data includes monitoring output signals of at least one sensor to the host control device, wherein the host control device is a sound bar.

8. The method of claim 1, wherein monitoring received sensor data associated with user presence includes detecting a vacancy for an area associated with the host control device, wherein the method occurs during a meeting that employs the host control device, the host control device being a soundbar.

9. The method of claim 1, wherein monitoring includes determining timeout of an idle period for the remote control device.

10. A host control device comprising:
a communications unit, and
a controller coupled to the communications unit, the controller configured to:
  detect a status indication of a remote control device, wherein the status indication is associated with a power-on state of the remote control device;
  monitor received sensor data associated with user presence, wherein user presence is determined by at least one external motion sensor for a space; and
  output a control signal to the remote control device for the remote control device to enter a low power state, wherein the remote control device is remotely located from the host control device, and the external motion sensor is remotely located from each of the host device and the remote control device.

11. A system comprising:
a remote control device;
at least one external motion sensor for a space; and
a host control device, the host control device configured to:
  detect a status indication of the remote control device, wherein the status indication is associated with a power-on state of the remote control device;
  monitor received sensor data associated with user presence, wherein user presence is determined by the at least one external motion sensor for the space; and
  output a control signal to the remote control device, wherein the control signal is for the remote control device to enter a low power state, wherein the remote control device is remotely located from the host control device, both the remote control device and the host device positioned in the space, and the at least one external motion sensor is remotely located from each of the host device and the remote control device.

12. The system of claim 11, wherein the host control device is at least one of a loudspeaker unit, communications device, and display device.

13. The system of claim 11, wherein the status indication is a wireless communication received from the remote control device.

14. The system of claim 11, wherein the remote control device is configured to transmit control signals to the host control device and receive control signals for an operational state of the host control device.

15. The system of claim 11, wherein the remote control device is configured to indicate at least one operational state of the host control device.

16. The system of claim 11, wherein monitoring received sensor data includes monitoring presence of at least one user relative to the host control device.

17. The system of claim 11, wherein monitoring received sensor data includes monitoring output signals of at least one sensor to the host control device.

18. The system of claim 11, wherein monitoring received sensor data associated with user presence includes detecting a vacancy for an area associated with the host control device.

19. The system of claim 11, wherein monitoring includes determining timeout of an idle period for the remote control device.

20. The system of claim 11, wherein the remote control device is configured to enter the low power state in response to the control signal.

* * * * *